(12) United States Patent
Tweedie

(10) Patent No.: US 9,155,292 B1
(45) Date of Patent: Oct. 13, 2015

(54) SAND SPIKE ACCESSORY APPARATUS

(71) Applicant: Jeremy Nathan Tweedie, Stephens City, VA (US)

(72) Inventor: Jeremy Nathan Tweedie, Stephens City, VA (US)

(73) Assignee: Jeremy Nathan Tweedie, Stephens City, VA (US)

( * ) Notice: Subject to any disclaimer, the term of this patent is extended or adjusted under 35 U.S.C. 154(b) by 0 days.

(21) Appl. No.: 14/563,518

(22) Filed: Dec. 8, 2014

(51) Int. Cl.
| | | |
|---|---|---|
| *A01K 97/00* | (2006.01) | |
| *A01K 97/10* | (2006.01) | |
| *E02D 5/80* | (2006.01) | |
| *E04H 12/22* | (2006.01) | |

(52) U.S. Cl.
CPC . *A01K 97/10* (2013.01); *E02D 5/80* (2013.01); *E04H 12/22* (2013.01); *E04H 12/2238* (2013.01); *E04H 12/2269* (2013.01)

(58) Field of Classification Search
USPC ............... 248/309.1, 311.2, 314; 211/70.8; 43/21.2
See application file for complete search history.

(56) References Cited

U.S. PATENT DOCUMENTS

| | | | | |
|---|---|---|---|---|
| 5,493,976 | A * | 2/1996 | Hammond | 108/50.12 |
| 7,007,813 | B2 * | 3/2006 | Yang | 211/131.1 |
| 7,937,883 | B2 * | 5/2011 | Roemer et al. | 43/21.2 |
| 8,640,894 | B1 * | 2/2014 | Cronin | 211/205 |
| 8,720,349 | B1 * | 5/2014 | David | 108/50.12 |

\* cited by examiner

*Primary Examiner* — Steven Marsh

(57) ABSTRACT

The Invention is a sand spike accessory apparatus for use with a plastic tube fishing rod holder, such as a cylindrical sand spike. A tray attachment body is composed of a one piece solid plastic material with defined geometric openings and recessions. The defined openings have a diameter less than the diameter of the cylindrical sand spike. The openings resiliently retain the tray attachment body on the cylindrical sand spike. The depressions within the tray attachment retain different sized beverages, bait, tackle, gear or other items utilized during surf fishing. The tray attachment can be readily installed and removed from a sand spike.

3 Claims, 5 Drawing Sheets

SAND SPIKE ACCESSORY APPARATUS

FIELD OF THE INVENTION

The Invention relates generally to the sport of fishing and specifically to surf fishing using a cylindrical sand spike fishing rod holder. The Invention is a "sand spike accessory apparatus" that is formed in a one piece tray which allows a user conveniently to support different sized beverages, bait, tackle and other gear and items on their sand spike while surf fishing.

DESCRIPTION OF THE RELATED ART

In the prior art of surf fishing, a fisherman utilizes a plastic tube that is adapted to be driven into the sand to hold a fishing rod. A common design for a surf fishing rod holder comprises of a cylindrical plastic tube commonly known as a "sand spike." The use of a sand spike allows a fisherman to operate one or multiple fishing rods and associated tackle simultaneously. The sand spike is generally placed in a location convenient for the fisherman to store the rod while fishing; otherwise relieving the fisherman from the obligation of manually holding the rod. A sand spike also allows the fisherman to engage in other activities while awaiting a fish such as tending to a beverage or maintaining bait, tackle, and gear.

Providing a cylindrical tray attachment to a sand spike will allow for a central location for which a fisherman may place, hold, and store beverages, gear, or tackle as well as perform other actions while fishing as desirable. Providing a cylindrical tray attachment that is readily secured to a sand spike by a user to suit the user's needs and hold various items while surf fishing as desirable.

Sand spikes and associated apparatus have been addressed by the prior art:
U.S. Pat. No. 4,372,072 to Comeau issued Feb. 8, 1983 teaches a sand spike for surf fishing.
U.S. Pat. No. 4,293,113 to Gray issued Oct. 6, 1981 teaches a fishing rod holder that may be inserted into the sand by a sand spike or hung from a car or from a railing.
U.S. Pat. No. 3,344,551 to Chestnut issued Oct. 3, 1967 teaches a surf fishing rod holder having a sharpened stick for insertion in the ground.
U.S. Pat. No. 2,877,828 to Barnette issued Mar. 17, 1959 teaches a folding fisherman's stool and rod holder mounted on top of a support that is driven into the ground.
U.S. Pat. No. 1,654,876 to Hemming issued Apr. 3, 1926 teaches a fishing pole holder including a rod having a sharpened lower end to be driven into the ground.
U.S. Pub. No. 0048441 to Sharff Mar. 9, 2006 teaches of a fishing apparatus made of closed cell adapted as a shelf body to retain the rod holder and configured by users.

None of the prior art patents discloses the features of the present Invention.

SUMMARY OF THE INVENTION

The Invention is a "sand spike accessory apparatus" that is an easily installed and removable circular tray attachment for use with a fishing rod holder, specifically a cylindrical plastic tube commonly known as a "sand spike". The circular tray attachment is formed with defined geometric shaped recessions, circular openings and is composed of a one piece solid plastic material. Two circular recessions located on opposite sides of the center circular opening within the tray attachment retain different sized beverages, while the other two irregular shaped recessions on either side of the center circular opening retain bait, tackle, or other gear utilized during surf fishing. The circular tray attachment defines two circular opening apertures; both opened to the other by a keyway and both having a nominally smaller inside diameter less than the outside diameter of the sand spike. The center opening of the circular tray attachment allows the fisherman to pass the sand spike through the center opening of the attachment, flexing the keyway outward, thus securing it by compression against the sand spike's outer diameter walls. The pressure applied by the center walls of the circular tray attachment to the sand spike causes the sand spike to apply equal pressure to the center walls of the circular tray attachment, which retains the one piece circular tray attachment in position on the sand spike. When two circular tray attachments are utilized with two separate sand spikes, the second opening apertures which are offset from the center opening aperture allows the fisherman to pass the sand spikes through each of the others offset opening apertures converting the circular tray attachments to self-support each of the others' sand spike, which then converts the circular tray attachments to act as a carrying device for one or more sand spikes. The fisherman may rotate the circular tray attachment around the sand spike to any desired location. A wide range of vertical positions of the circular tray attachment on the sand spike are possible.

DETAILED DESCRIPTION OF THE PREFERRED EMBODIMENT

Figure 1:
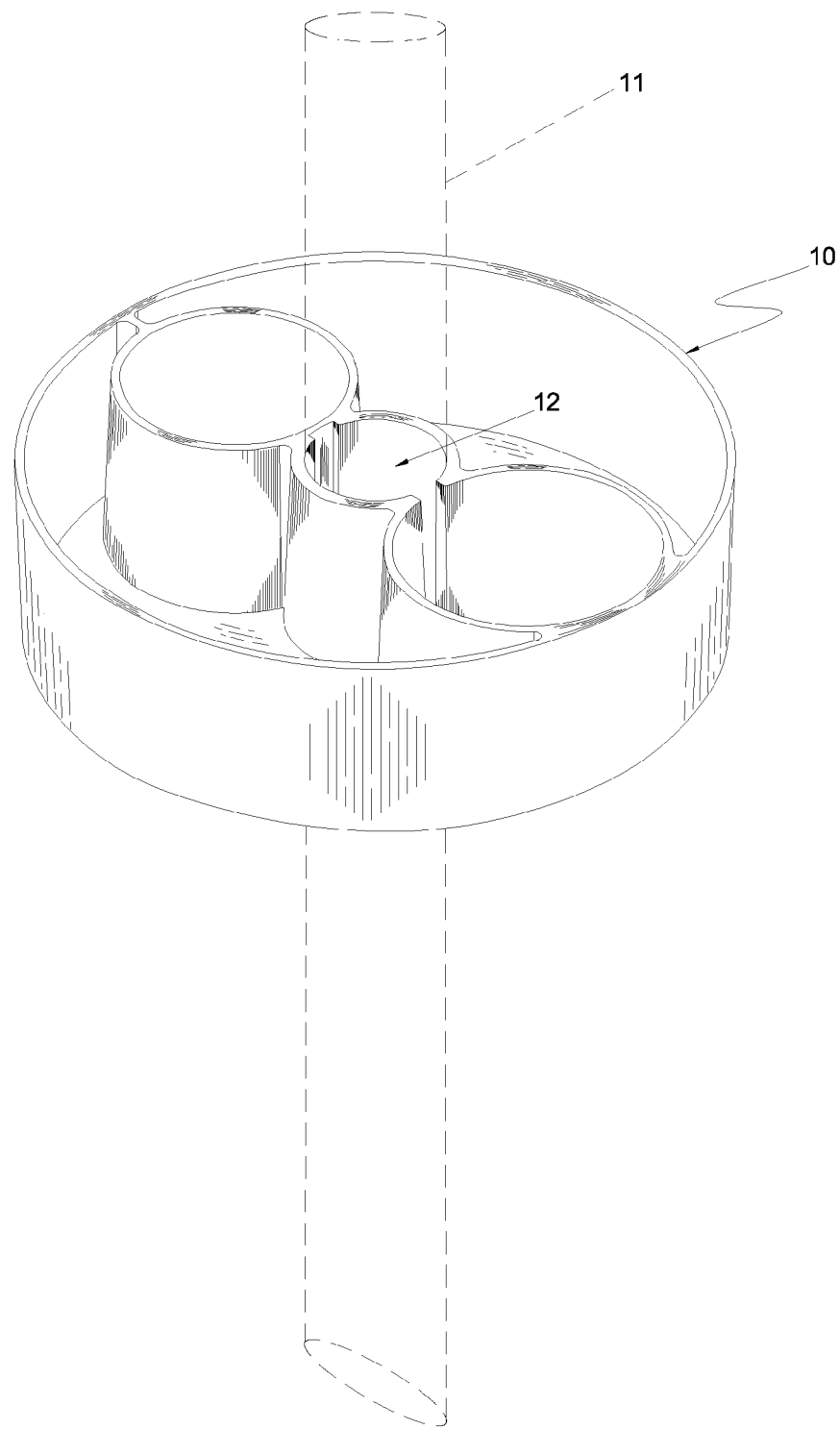
FIG. 1 is a perspective view of the Invention installed on a sand spike

For the purposes of promoting an understanding of the principles of the invention and presenting its currently understood best mode of operation, reference will be made to the embodiments illustrated in the drawing and the specific language will be used to describe the same. It will nevertheless be understood that no limitation of the scope of the invention is thereby intended, with alterations and further applications of the principle of the invention as illustrated therein being contemplated as would normally occur to one skilled in the art to which the invention relates.

Figure 2:
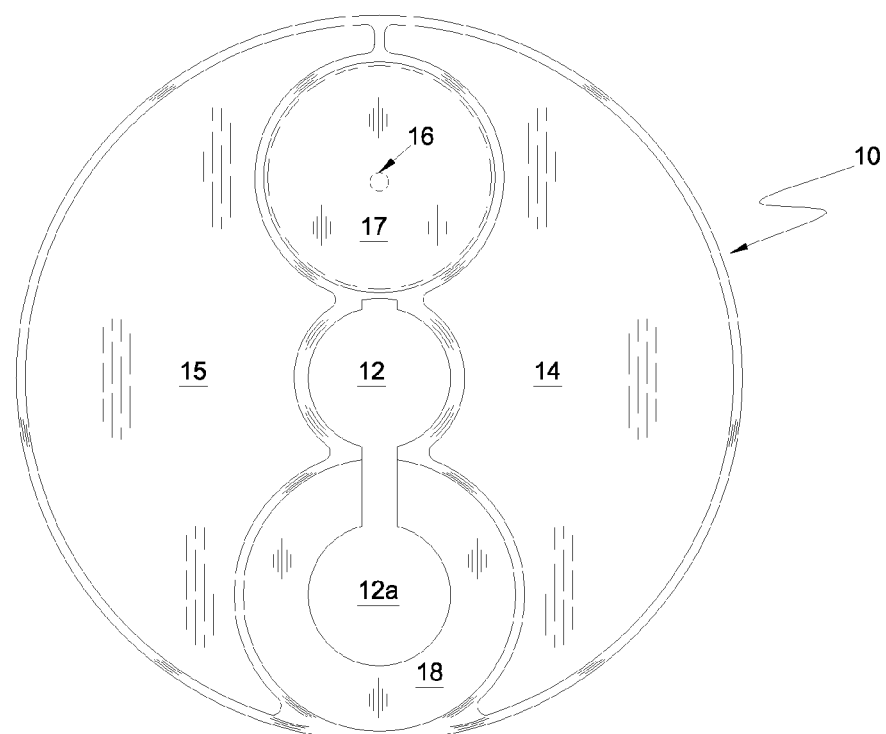
FIG. 2 is a top plan view of FIG. 1.
Figure 3:
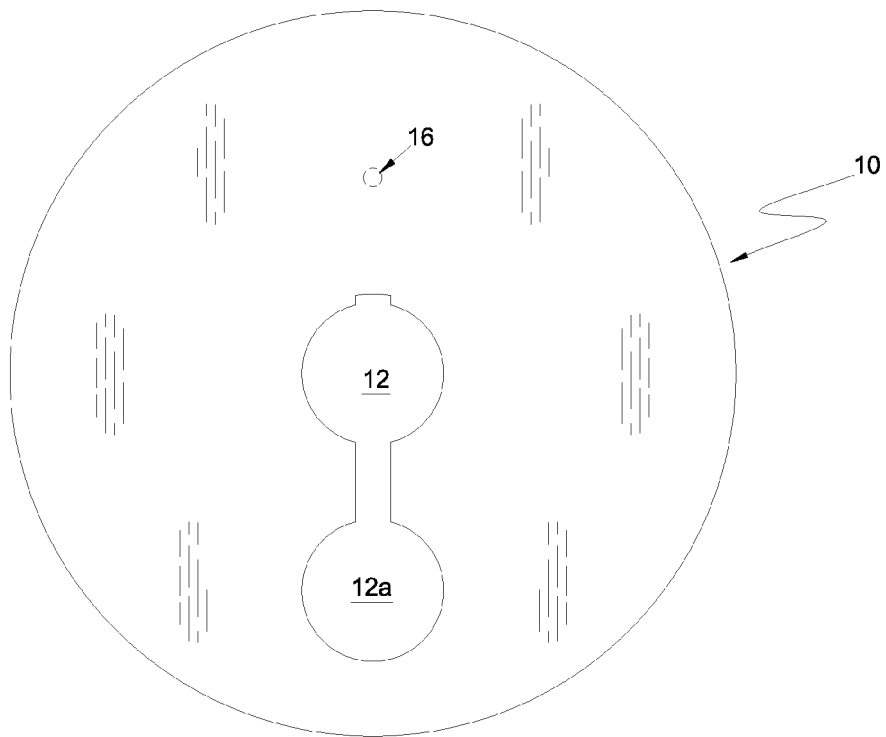
FIG. 3 is a bottom plan view of FIG. 1.
Figure 4:
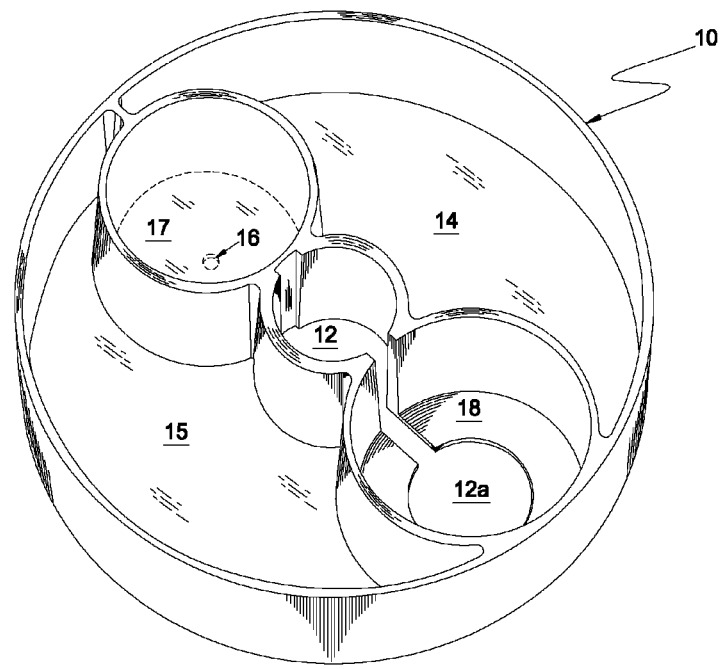
FIG. 4 is an isometric view of FIG. 1 without sand spike.
Figure 5:
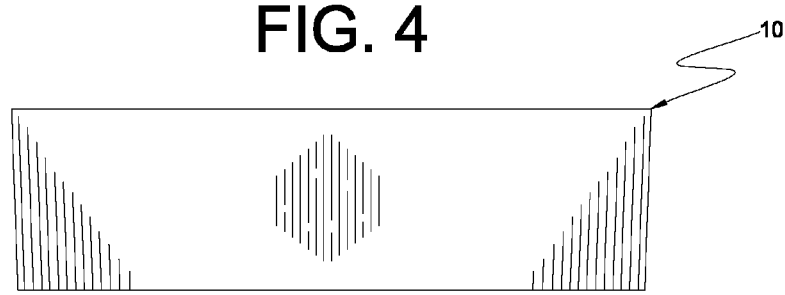
FIG. 5 is a front elevation view of FIG. 1.
Figure 6:
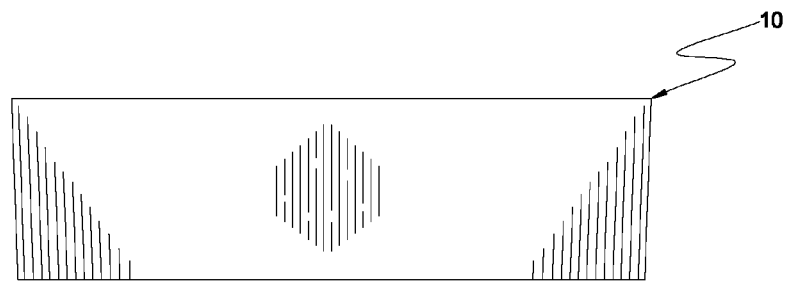
FIG. 6 is a rear elevation view of FIG. 1.
Figure 7:
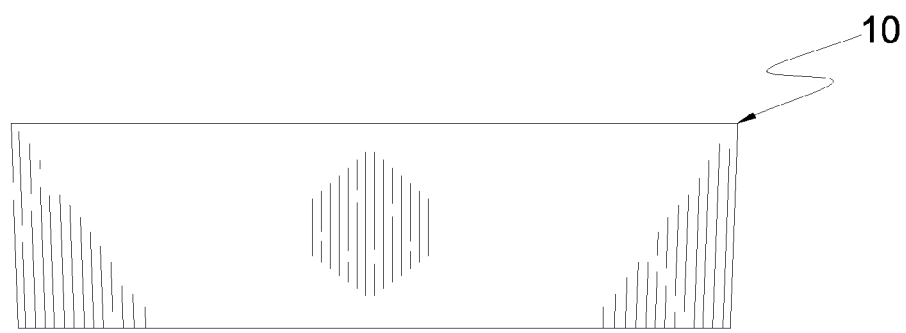
FIG. 7 is a right elevation view of FIG. 1.
Figure 8:
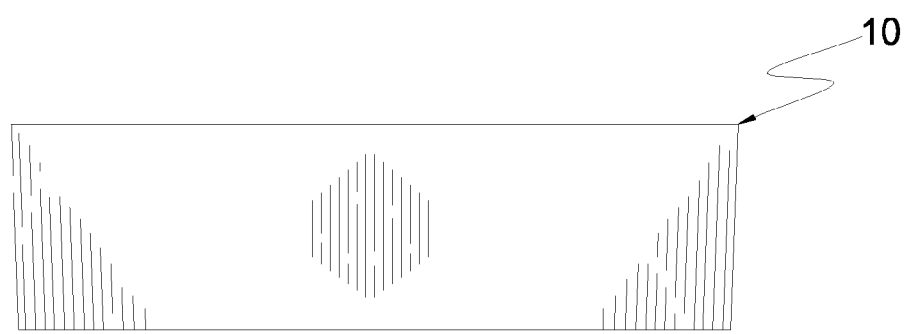
FIG. 8 is a left elevation view of FIG. 1.
Figure 9:
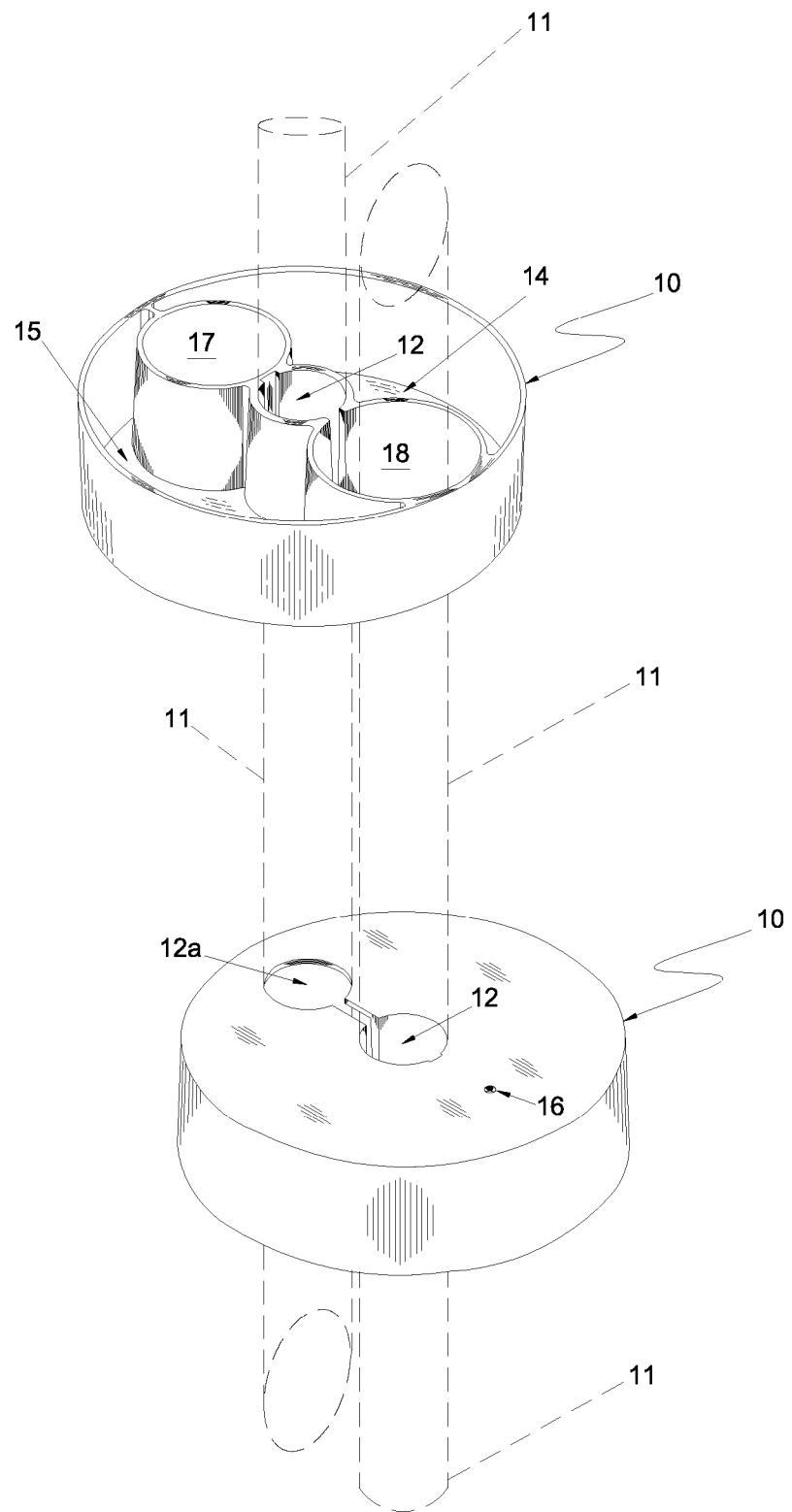
FIG. 9 is a view of a quantity of 2 FIG. 1. Interconnected.

The present invention is a one piece cylindrical tray attachment accessory (10) which is configured for use by inserting a sand spike fishing rod holder (11) through the central aperture (12) as shown by FIG. 1. The one-piece cylindrical tray attachment accessory (10) of the preferred embodiment of the invention shown in FIGS. 1-9 comprise of the invention in its entirety. FIGS. 2 and 4 show the cylindrical tray attachment accessory (10) comprising of a center aperture (12) for engaging and releasing of a sand spike fishing rod holder (11). Shown best in FIG. 9. the offset aperture (12a) is for use with two circular tray attachments (10) for self-retaining of one or more sand spike fishing rod holders (11). FIGS. 2 and 4 show the two irregular shaped Recessions (14) and (15) for ancillary storage, additionally recession (17), which contains a weep hole (16) and recession (18), which contains the offset aperture (12a) are located on opposite sides of the center aperture (12) and retain different sized beverages. FIG. 3 shows the bottom of the one-piece cylindrical tray attachment accessory (10). FIGS. 5-8 show the side elevations of a one-piece cylindrical tray attachment accessory (10).

The invention claimed is:

1. A sand spike accessory apparatus comprising:
a first one-piece cylindrical tray apparatus accessory in combination with at least one cylindrical plastic tube fishing rod holder or at least one sand spike, the first one-piece cylindrical tray apparatus accessory having a top surface,
said first one-piece cylindrical tray apparatus accessory further comprising at least a center aperture and an aperture offset from center, both extending in an upward direction from the a horizontal surface of the first one-piece cylindrical tray apparatus accessory,
a second one-piece tray apparatus accessory, identical to the first one-piece cylindrical tray apparatus accessory, wherein the second one-piece tray apparatus accessory engages the plastic tube fishing rod holder or sand spike in a configuration that is rotated 180 degrees relative to the first one-piece tray apparatus accessory so that at least a second central aperture and a second aperture offset from center extend in a downward direction from a second horizontal surface of the second one-piece tray accessory, thereby interlocking the at least one cylindrical plastic tube fishing rod holder or at least one sand spike, to a second cylindrical plastic tube fishing rod holder or second sand spike.

2. The device as in claim 1 Wherein there are two or more irregular shaped recessions for ancillary storage located on opposite sides of the center aperture.

3. The device as in claim 1 Wherein there are two circular shaped recessions for beverage retainage located on opposite sides of the center aperture.

* * * * *